(12) United States Patent
Chenoweth

(10) Patent No.: US 6,418,755 B2
(45) Date of Patent: Jul. 16, 2002

(54) GLASS MELTING APPARATUS AND METHOD INCLUDING EXHAUSTING THE FURNACE ATMOSPHERE BY REMOVAL OF A HEATING ELEMENT

(75) Inventor: Vaughn Charles Chenoweth, Coldwater, MI (US)

(73) Assignee: Guardian Fiberglass, Inc., Albion, MI (US)

( * ) Notice: Subject to any disclaimer, the term of this patent is extended or adjusted under 35 U.S.C. 154(b) by 0 days.

(21) Appl. No.: 09/824,700

(22) Filed: Apr. 4, 2001

Related U.S. Application Data

(60) Division of application No. 09/540,037, filed on Mar. 31, 2000, now Pat. No. 6,314,760, which is a division of application No. 09/342,224, filed on Jun. 29, 1999, now Pat. No. 6,044,667, which is a continuation-in-part of application No. 08/917,207, filed on Aug. 25, 1997, now Pat. No. 5,961,686.

(51) Int. Cl.[7] .............................................. C03B 5/237
(52) U.S. Cl. .................... 65/134.6; 65/135.6; 65/29.13; 65/346; 432/47; 432/152; 432/1.76; 432/192; 432/193
(58) Field of Search ............................ 65/134.6, 135.6, 65/346, 29.13; 373/110; 432/47, 152, 176, 192, 193

(56) References Cited

U.S. PATENT DOCUMENTS

| | | |
|---|---|---|
| 2,089,690 A | 8/1937 | Cornelius |
| 2,591,708 A | 4/1952 | Lubatti |
| 2,926,208 A | 2/1960 | Eden |
| 3,142,551 A * | 7/1964 | Von Wranau ................ 65/346 |
| 3,498,779 A | 3/1970 | Hathaway |
| 3,499,743 A * | 3/1970 | Fanica et al. ................ 65/346 |
| 3,520,979 A | 7/1970 | Scarfe et al. |
| 3,897,234 A | 7/1975 | Froberg |
| 3,983,309 A | 9/1976 | Faulkner et al. |
| 3,988,138 A | 10/1976 | Rough |
| 4,001,001 A | 1/1977 | Knavish et al. |
| 4,017,294 A | 4/1977 | Sanford et al. |
| 4,023,950 A | 5/1977 | Glaser |
| 4,069,032 A * | 1/1978 | Brax ............................ 65/346 |
| 4,142,880 A | 3/1979 | Wenda et al. |
| 4,159,392 A | 6/1979 | Fineo et al. |
| RE30,521 E | 2/1981 | Faulkner et al. |
| 4,312,657 A | 1/1982 | Canfield et al. |
| 4,324,942 A | 4/1982 | Williamson |
| 4,351,054 A | 9/1982 | Olds |
| 4,365,987 A | 12/1982 | Boettner |
| 4,405,351 A | 9/1983 | Sheinkop |
| 4,592,770 A | 6/1986 | Pearman et al. |
| 4,726,831 A | 2/1988 | Fogle et al. |
| 4,737,178 A | 4/1988 | Reifschneider et al. |
| 4,738,938 A | 4/1988 | Kunkle et al. |
| 4,812,372 A | 3/1989 | Kithany |
| 4,862,477 A | 8/1989 | Olds et al. |
| 4,994,099 A | 2/1991 | Boettner |
| 5,194,081 A | 3/1993 | Trevelyan et al. |
| 5,198,010 A * | 3/1993 | Ward ............................ 65/346 |
| 5,327,452 A * | 7/1994 | McMinn ...................... 65/346 |
| 5,417,732 A | 5/1995 | Shamp et al. |
| 5,613,994 A | 3/1997 | Muniz et al. |
| 5,718,741 A * | 2/1998 | Hull et al. .................... 65/346 |
| 5,776,221 A | 7/1998 | Dembicki et al. |
| 6,154,481 A * | 11/2000 | Sorg et al. .................... 65/346 |

* cited by examiner

*Primary Examiner*—Michael Colaianni
(74) *Attorney, Agent, or Firm*—Hall, Priddy, Myers & Vande Sande

(57) ABSTRACT

A system for melting and delivering glass to a work area such as spinners for making fiberglass includes a melter with heaters so arranged that the "hot spot" in the molten glass is located away from the walls and corrosion sensitive parts so that the various elements of the melter wear out at substantially the same time. The system is further provided with a dual exhaust arrangement when the melter, conditioner and forehearth are located on the same floor of the plant, the first exhaust being at the juncture of the melter and conditioner, and the second being an alternating replacement for one of the heating/cooling orifices and mechanisms in the conditioner, so as to effectively limit the amount of corrosive volatiles reaching the forehearth.

5 Claims, 4 Drawing Sheets

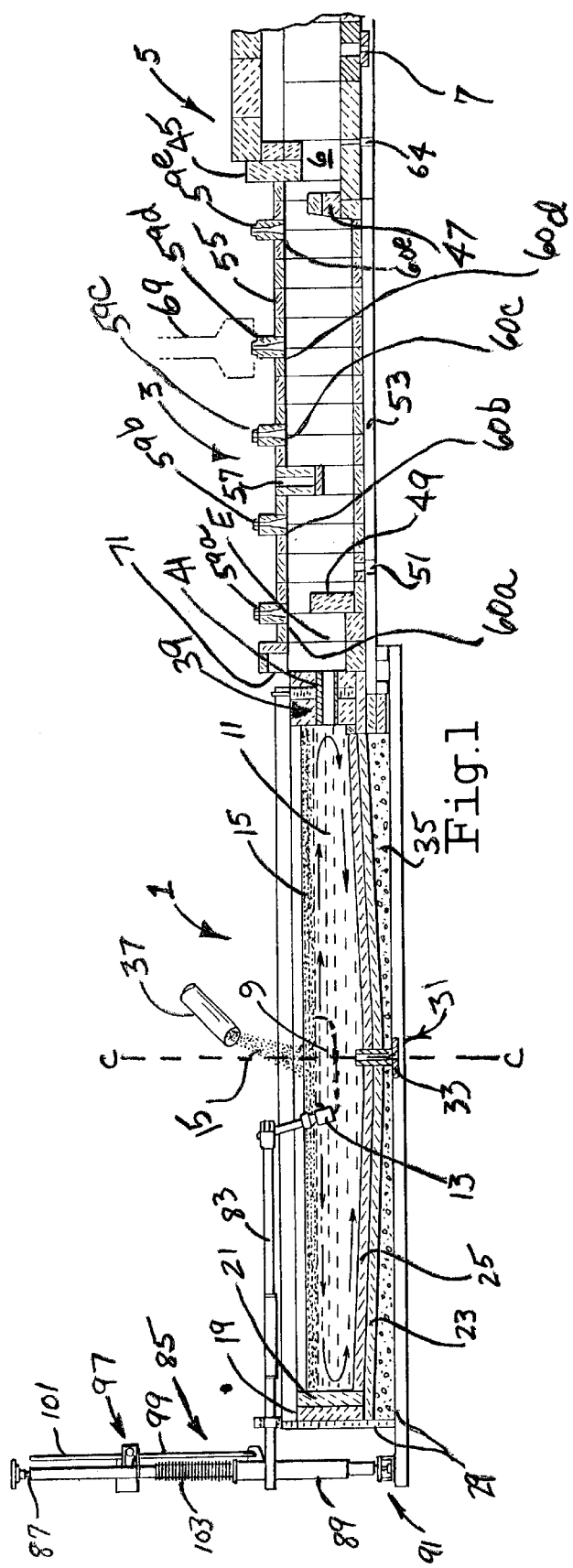

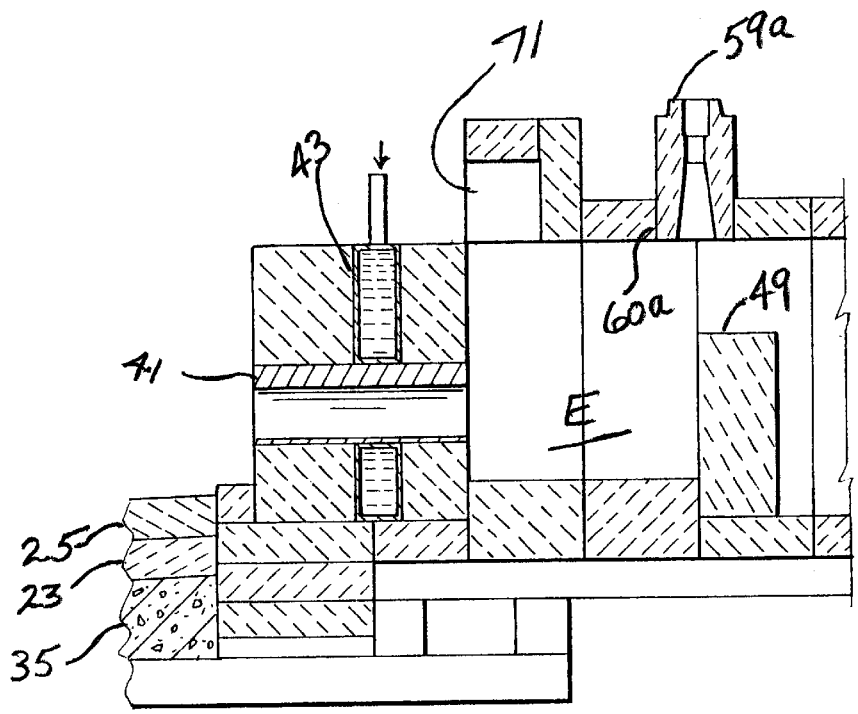
Fig.4
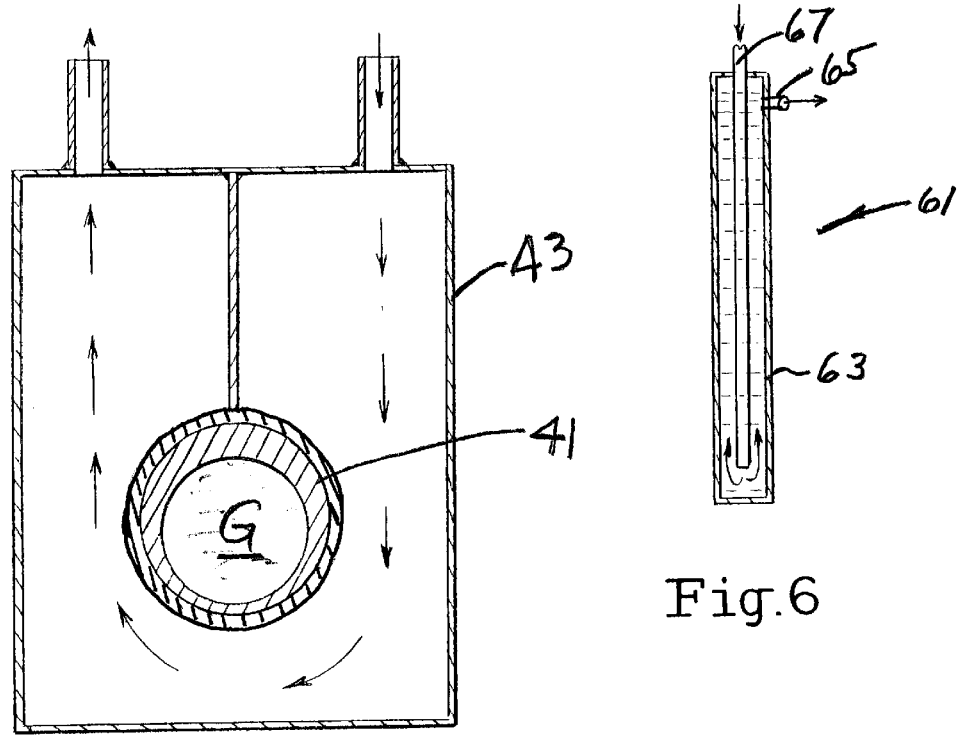
Fig.5
Fig.6

GLASS MELTING APPARATUS AND METHOD INCLUDING EXHAUSTING THE FURNACE ATMOSPHERE BY REMOVAL OF A HEATING ELEMENT

RELATED APPLICATION

This application is a division of application Ser. No. 09/540,037 filed Mar. 31, 2000, now U.S. Pat. No. 6,134,760, which is a division of application Ser. No. 09/342,224 filed Jun. 29, 1999, now U.S. Pat. No. 6,044,667, which continuation-in-part of application Ser. No. 08/917,207 filed Aug. 25, 1997, now U.S. Pat. No. 5,961,686.

BACKGROUND OF THE INVENTION

This invention relates to certain improvements in apparatus and methods for melting glass. More particularly, this invention relates to apparatus and methods which control the location of the "hot spot," i.e. area of highest temperature in the liquid pool of melting or molten glass in a glass melter so as to control the wear out of various melter and discharge elements thereby reducing the number of shutdowns needed for replacement or rebuild purposes. Still further, this invention relates to unique methods and apparatus for venting corrosive volatiles from the system.

Melters of various shapes and sizes which present glass batch (usually in powdered ingredient form, with or without cullet) often by floating the batch material as a relatively thick layer on top of a molten pool of glass being heated and melted beneath the batch, and thereafter distributing the molten glass from the pool through a discharge port in a side wall of the melter to a conditioning zone (conditioner), and thereafter to a forehearth array or other working area, are well known in the art. Exemplary of such systems are conventional, in line combinations of a melter, conditioner, and forehearth used to distribute molten glass to an array of spinners for making fiberglass batts of insulation. Other uses for such combinations are, of course, known, and the art, as a whole, is generally represented by the following prior art references:

| U.S. Pat. No. | 3,498,779 | 4,365,987 |
|---|---|---|
| | 3,897,234 | 4,812,372 |
| | 4,001,001 | 4,994,099 |
| | 4,017,294 | 5,194,081 |
| | 4,023,950 | 5,616,994 |

Generally speaking, and prior to my invention in the aforesaid application Ser. No. 08/917,207, now U.S. Pat. No. 5,961,686, the art of glass making accepted the problem of multiple shutdowns due to the fact that the various elements in conventional melters, except in very unusual and unpredictable situations, wore out at different times. In this respect, it is characteristic in the prior art construction of melters to employ a cylindrical or rectangular tank-like configuration in which the side and bottom walls are formed of refractory material such as Cr, Al—Zr—Si, or Al/Cr based compositions whose corrosion rate usually increases with increased temperatures. Adding to this problem is the fact that in such configurations one or more discharge ports are either required or desired at different locations within the tank, e.g. in the bottom wall and in at least one location in the side wall of the tank. Because the temperature of the glass can, and often does, differ markedly between a "hot spot" volume in the molten glass, usually in the center of the tank near the bottom wall, and the remaining molten glass volume, e.g. at the side walls, melter parts in the cooler areas wear out less rapidly than parts located in or proximal the "hot spot."

In a typical example of this problem, the melting tank is provided in its bottom wall with a discharge port for draining the tank and a side discharge port for distributing the molten glass to a conditioning zone. Such discharge ports, whether in the bottom or side walls, are normally formed of molybdenum or an alloy thereof which is relatively corrosion resistant and thus is reasonably able to withstand the high temperatures experienced in the melter over a given period of time. Unfortunately, like the refractory wall material, these molybdenum based ports have a corrosion rate which increases with temperature.

In many melters it has also been conventional to cool the walls by various techniques such as with a water-cooled shell surrounding the melter. Such cooling of the bottom and side walls, despite inherent currents of flow in the molten glass, tend to isolate the "hot spot" and set up the temperature differentials as discussed above, which then lead to the differences in wear out rates of the various parts and the need for expensive, time consuming, multiple shutdowns otherwise unnecessary if all the parts were to wear out at substantially the same time.

In a typical prior art melter, for example, usually of a circular, cylindrical bottom, side wall configuration, the furnace is open topped, side and bottom wall cooled, and is provided with electrodes to melt the batch material. These electrodes are usually located in the melter either above the batch or in the molten pool of glass itself, often near the bottom or inserted through the batch. Powdered batch material is then "floated" on top of the melting glass beneath it, usually by a conventional, metered batch delivery system located above the melt area and fed by gravity continuously to the batch layer as its underneath surface melts into the molten volume of glass beneath it. It is, of course, within this molten glass volume beneath the batch layer that the aforesaid "hot spot" forms.

While convection currents created in the melting glass serve to equalize, somewhat, the temperature of the molten glass pool, it is very often an inherent characteristic of such melters, particularly where bottom entry electrodes are employed, that the bottom center of the melter is where the "hot spot" forms. For example, a typical "hot spot" may be from about 3150°-3250° F. By contrast, the side walls will only then be, particularly if water-cooled, at a significantly lower temperature, e.g. about 2500°-2700° F. Even if water-cooled, in certain instances, the bottom wall will be so close to the "hot spot" that its temperature in a localized area will, for all intents and purposes, be that of the "hot spot," thus differing from other areas of the bottom wall, as well as the side wall and discharge port in the side wall. Since the drainage port is conventionally located in the center of the bottom wall, and thus at or proximal the usual "hot spot" location, its corrosion rate differs markedly from that of the side discharge port and side walls.

As exemplified by the above typical melter arrangement, multiple melter shutdowns may thus become necessary. For example, the discharge drain port and/or bottom wall may have to be replaced, while the side walls and side discharge port remain in acceptable operating condition, only to have to replace one or more of these two latter parts at a later time in a second shutdown, while the replaced bottom wall and/or drain discharge port are not yet worn sufficiently to economically justify their replacement.

In short, it would constitute a considerable advance in the art of glass melting if a technique were developed which could control the location of the aforesaid "hot spot" in a glass melter so as to displace it (locate it) away from the refractory walls and metallic discharge port tubes (side and bottom) such that all of the elements in the melter subject to corrosion and wear out therefrom were to wear out at substantially the same time.

The term "at substantially the same time," as used herein, means that the elements which are the subject of corrosive wear out are in such a condition at the time that one element is in the most advanced condition of wear out, that it is economically justifiable to replace all the elements, rather than to go through another shutdown to replace a less worn out element when it completely wears out later in time.

In my aforesaid co-pending application Ser. No. 08/917,207, now U.S. Pat. No. 5,961,686, the disclosure of which is incorporated herein by reference, a significant advance toward reaching this goal and solving this prior art problem was achieved, based upon the acceptance of the inherent location of the "hot spot" in the melter. By the use of a unique discharge port concept located in the side wall of the melter, a sufficient distance away from the "hot spot," coupled optionally with side and bottom wall cooling means, the side discharge ports and side walls could justifiably be replaced at the same time. In addition, in certain embodiments, by relying on convection currents and sufficient bottom wall cooling, the bottom wall and bottom discharge drain theoretically could, at times, be controlled to wear out at substantially the same time as the side wall and side discharge port. Despite this significant advance in the art, it has now been found that the "hot spot" (i.e. volume of highest temperature) often exists, in certain furnaces, inherently too close to the bottom and/or side walls of the melter tank and that circulation currents, even with wall cooling, are insufficient to keep the wear out rate of the bottom wall and bottom discharge orifice truly substantially equal to that of the side walls and side discharge orifice. Thus there continues to be a need in the art for a still further improvement which creates an even more equalized wear out rate among the essential parts in the melter (e.g. the refractory melter lining which makes up the melter walls, side and bottom, and the various discharge ports in these walls.

There is yet another problem which the art of glass melting has had to face. In many glass melting operations, such as in melting glass ultimately used to make fiberglass insulation, it is necessary to employ batch ingredients which create highly corrosive volatiles during the melting and/or conditioning operation. These volatiles often end up in the atmosphere above the glass and can thus rapidly corrode walls, orifices and heater elements if not effectively exhausted from the system. Such volatiles are well known and include, for example, various sodium and borate compounds.

In melting systems which do not employ, or need not employ, the highly advantageous technique during glass melting of floating batch material in a relatively thick layer (e.g. about 3"–4", or at times as high as 10") on top of the molten glass, the corrosive volatiles can usually be exhausted during melting by exhausting them from the melter itself. However, when the more desirable batch technique of floating the batch on top of a molten pool of glass is employed, the volatiles do not readily escape through the batch, but rather are only released in the conditioner when the molten glass is then freed from the batch material being on top of it. This, then, gives rise to the need for a new technique for effectively eliminating corrosive volatiles from the glass in the conditioner, particularly before they reach the forehearth.

It is a purpose of this invention to fulfill the above needs in the art, as well as other needs which will become apparent to the skilled artisan once given the following disclosure.

SUMMARY OF THE INVENTION

Generally speaking, this invention fulfills at least one of the above-described needs in the art by providing both a method and an apparatus for melting glass which controls the location of the "hot spot" so as to locate it within the melt at a sufficient distance from the side and bottom walls, as well as any discharge orifice therein, so that the discharge orifices and walls (bottom and side) may be replaced at substantially the same time.

In one embodiment of this invention this is accomplished by providing in a melter for melting glass from batch material therein in which the batch material is floated on top of a pool of molten glass and the batch is melted by heating means so located as to form a finite volume of molten glass within the pool of molten glass, which finite volume is at a temperature substantially higher than the remainder of the molten glass within said pool, the melter including a side wall and a bottom wall and a discharge port located within at least one of the walls, the improvement comprising wherein:

the heating means are so located as to create this finite volume of substantially higher temperature at a spaced distance from the walls and any side discharge orifice located in the walls whereby the walls and any side discharge orifice wear out at substantially the same time during melting of glass in the melter.

In certain preferred embodiments of this invention the heating means comprises a plurality of electrodes in a generally circular array located within the molten pool beneath the batch material floating thereon, and including a retaining structure for each electrode extending above the batch, which retaining structure includes an adjustment mechanism for adjusting the depth to which the electrode is inserted into the molten pool, and also, preferably, for adjusting the horizontal location of each electrode within the pool, as well. By adjustment of the electrode array both horizontally and vertically within the pool, the optimal location for the inevitable "hot spot" can be achieved for any particular size and/or configuration of melter tank (furnace) extant to optimize the goal of achieving substantially the same wear out time of the various melter parts.

In certain preferred embodiments, in this respect, the melter may be one of an open top type, with a water-cooled jacket or shell, whose batch feed, optionally, may be a simple tube located above and in the center of the electrode array. In still further preferred embodiments, the melter is a cylindrical tank with a side discharge port of the type disclosed in my aforesaid pending application Ser. No. 08/917,207, now U.S. Pat. No. 5,961,686. A particularly advantageous electrode array, in this respect, consists essentially of six electrodes equally spaced in a circular pattern about the center of the cylindrical tank, the radius of the circle being about one-third the radius of the inside diameter of the tank.

This invention further includes within its scope certain unique methods for melting glass. Generally speaking, in this respect, this invention includes in the method of melting glass in a melter which includes a bottom wall, a side wall and at least one discharge port located in a said wall and comprised of a corrosion resistant material whose corrosion rate increases with temperature, the steps comprising, forming a molten pool of glass within the melter, floating batch material on top of the molten pool, melting the batch material so as to add further molten glass to the pool, discharging molten glass from the melter through a discharge port, and during the melting of the glass batch material, creating within the pool a finite volume of molten glass which is at a significantly higher temperature than the remainder of the molten glass within the pool, the improvement which comprises forming the finite volume of the higher temperature molten glass at a location sufficiently removed from the walls and the discharge port such that the walls and discharge port wear out at substantially the same time.

This invention further includes within its scope certain unique apparatus and methods for exhausting corrosion causing volatiles from the overall system before they reach the forehearth, thus fulfilling yet other needs in the art.

Generally speaking, the unique apparatus as contemplated herein for exhausting volatiles during glass melting and distribution includes, in the combination of a walled melter, a walled conditioning system having at least one heating element extending through an orifice in a wall thereof and a forehearth, said melter being connected in molten glass flow communication with said conditioning system through a discharge port located in a wall of the melter at a first end of the conditioning system and the opposite end of the conditioning system being connected in molten glass flow communication with the forehearth, the improvement comprising at least one removable heating element extending through the orifice in a wall of the conditioning system and exhaust means proximal the orifice for exhausting corrosive volatiles from above the molten glass in the conditioning system through the orifice when the removable heating element is removed therefrom.

In certain preferred embodiments of this invention the melter, conditioning system and forehearth are all located in substantially the same horizontal plane. In certain other preferred embodiments, of course, this invention employs as its melter the aforesaid unique melter which controls the "hot spot" so that its various elements wear out at substantially the same time.

Still further, and generally speaking, the unique methods associated with this novel exhaust technique include in the method of melting, conditioning and distributing molten glass wherein the method includes the steps of providing in serial flow communication, a melter, a walled conditioner and a forehearth array, melting glass in the melter, delivering molten glass from the melter to the conditioner, providing at least one heating means located in an orifice in a wall of the conditioner, delivering the molten glass from the conditioner to the forehearth and distributing the molten glass from the forehearth, wherein the method further includes the step of removing a substantial portion of the corrosive volatiles from the atmosphere above the glass before they reach the forehearth, the improvement comprising, removing at least one of the heating means from its respective orifice thereby providing an open orifice in a wall of the conditioner, providing an exhaust means in exhaust functioning communication with respect to the open orifice, and exhausting corrosive volatiles from the conditioner through the open orifice.

In certain preferred embodiments the method as above set forth further includes the step of providing batch material on top of the molten glass in the melter.

This invention will now be described with respect to certain embodiments thereof accompanied by various illustrations wherein:

IN THE DRAWINGS

FIG. 1 is a partial side sectional view of one embodiment of this invention.

FIG. 4 is a partial side sectional view of the side discharge port and vent chamber of the embodiment of FIG. 1.

FIG. 5 is an end sectional view of the cooling means and side discharge tube of FIG. 1.

FIG. 6 is a side sectional view of a conditioner cooling means used in the practice of an embodiment of this invention.

DETAILED DESCRIPTION OF CERTAIN EMBODIMENTS

With reference initially to FIG. 1, there is illustrated therein an apparatus for melting glass according to this invention. The apparatus as illustrated includes a melter 1, a conditioner 3, and, as partially shown, a forehearth 5. Forehearth 5 is conventional and, for example, may be of the type provided with multiple orifices along its elongated bottom wall (not shown for convenience) for distributing molten, conditioned glass at an appropriate temperature to a conventional spinner array for making fiberglass insulation batts (also not shown for convenience). Orifice 7, as illustrated, is an air-cooled drain orifice in this embodiment used to drain the system during shutdown, the distribution orifices leading to fiberglass spinners being further downstream.

In the embodiment of FIG. 1 the three zones of operation, i.e. melter 1, conditioner 3, and forehearth 5 are preferably all located in substantially the same horizontal plane. This eliminates a known use of the location of the forehearth on a level (e.g. on a separate floor of the plant) below the conditioner, called the "drop area", which heretofore was advantageously used to exhaust volatiles from the system. In this way, the need to build into the plant facility a separate level or floor is eliminated and its considerable cost saved. However, this eliminates the aforesaid advantageous drop area between the exit end of conditioner 3 and entrance end 6 of forehearth 5 which was used to vent (exhaust) corrosive volatiles. This, in turn, gives rise to the unique venting system of this invention discussed above and described more fully below.

Figure 3:
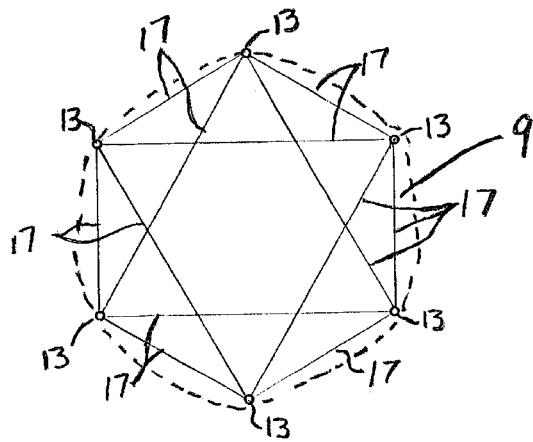
FIG. 3 is a schematic outline of the current pattern among the electrodes in the embodiment of FIG. 1.

Turning now to a more detailed description of melter 1, attention is directed, in addition to FIG. 1, to FIGS. 1A, 2 and 3. The mechanism illustrated is one embodiment of a mechanism as contemplated by this invention for selecting the location of, and controlling the size of, "hot spot" 9 created in molten glass pool 11 during the melting operation. As illustrated schematically in FIGS. 1, 1A, and 3 in dotted lines, by using an array of heating electrodes 13, and here preferably six, arranged in a substantially circular fashion below the layer of batch material 15 floating on pool 11, "hot spot" 9 is generally confined to a finite, generally hexagonal or circular cylindrically shaped volume of glass below batch 15, whose central vertical axis "C" corresponds with the central vertical axis of cylindrical melter tank 1. FIG. 3 is a schematic whose full lines illustrate the theoretical paths of heating current extending among the electrodes and whose dotted lines illustrate a top view of "hot spot" 9.

Melter 1 is of a conventional tank-like, cylindrical construction having conventional side wall 19, and bottom wall 23, each lined with refractory linings 21 and 25, respectively. Such refractory linings 21 and 25 may be formed of conventionally used refractory material such as a chromium based material which is known for its corrosion resistance, but whose corrosion rate increases with temperature. In a typical example, lining 21 may be 90% or more by weight Cr, while linings 19, 23, and 25 may have less Cr, e.g. about 30–50% by weight. Melter 1 further includes in conventional fashion drain discharge port 31 located centrally of melter 1. Discharge port 31 is conventionally formed of a corrosion resistant metallic tube 33 inserted through an orifice in shell 29, bed material 35, wall 23 and liner 25. Port 31 is principally used for draining glass from melter 1 preparatory to shutdown.

Figure 1A:
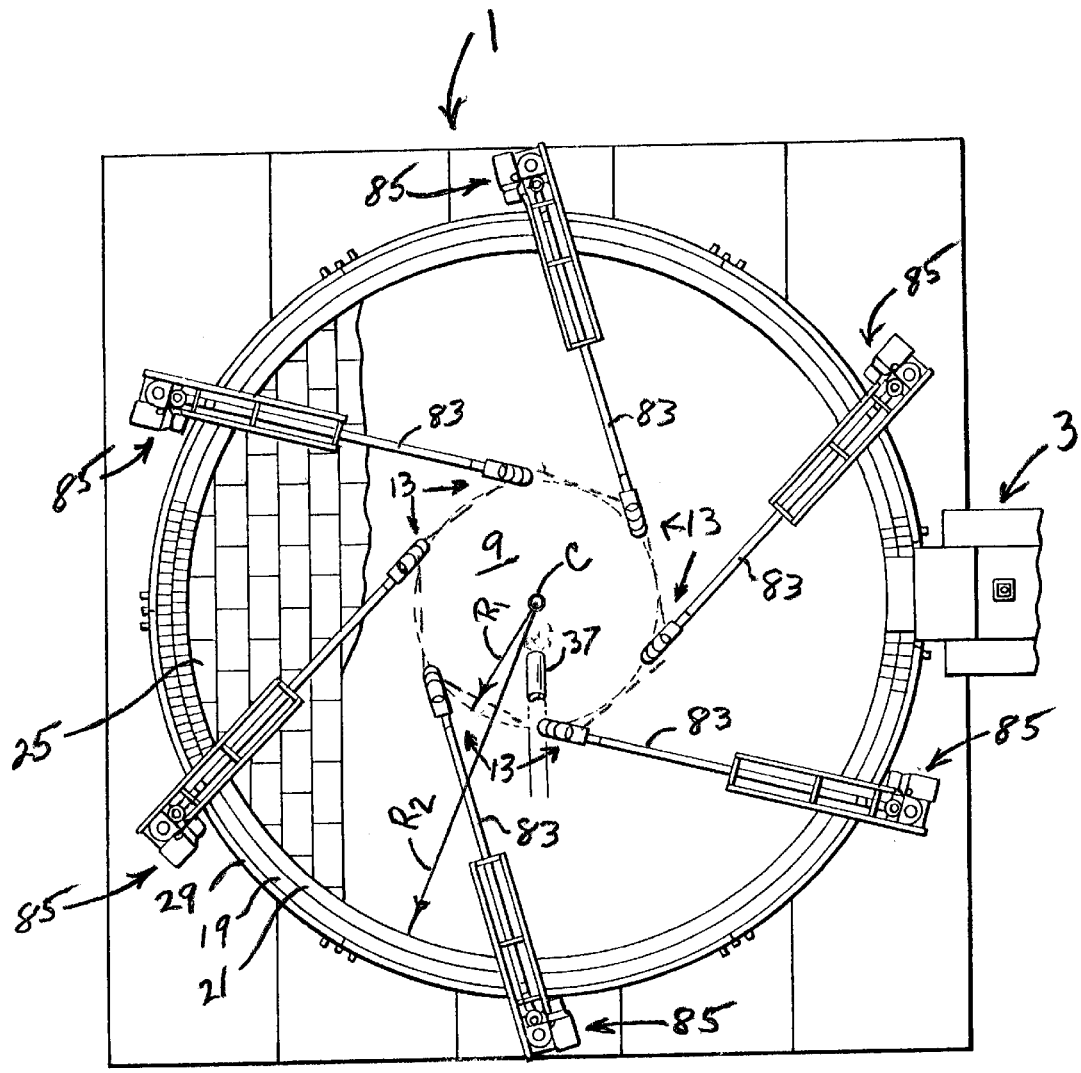
FIG. 1A is a partial top view of the embodiment of FIG. 1, with the molten glass and batch only partially shown so as to illustrate the inside bottom wall of the melter.
Figure 2:
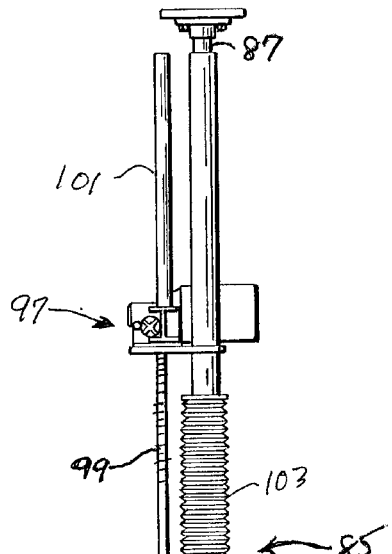
FIG. 2 is a partial side sectional view of the embodiment of FIG. 1.
Figure 2:
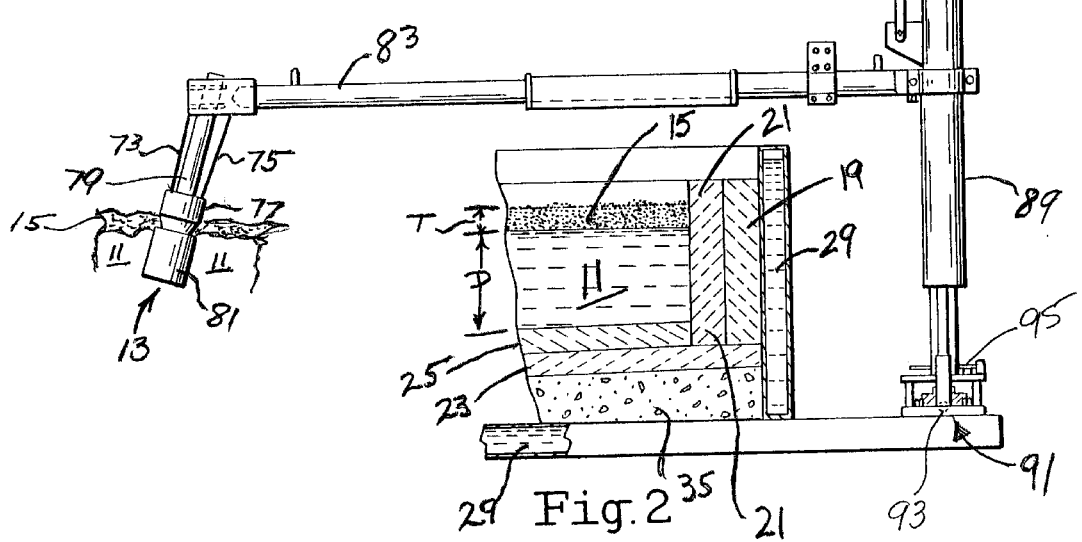

As further illustrated in FIG. 1, but better shown in FIG. 2, batch material 15 is floated on pool 11 of molten glass such that the underside surface of batch material 15 is constantly being melted while the batch layer is being added to as it is consumed by a conventional metered batch system whose exit end tube is shown at 37. As best illustrated in FIGS. 1, 1A, powdered batch 15 is fed by gravity to the substantial center of the circle having a radius R, whose circumference is subscribed by the location of the six electrodes 13 as points on the circle and whose center is contiguous vertical axis "C".

As best illustrated in FIG. 2, the depth "D" of molten pool 11 is the distance from the inner surface of lining 25 to the under surface of batch material layer 15. Distance "D" varies, of course, given the drainage slope in the bottom wall structure of melter tank 1. As shown in FIG. 1A, in one embodiment of such a melter 1, radius $R_2$ may be about 7–8 feet, radius $R_1$, about ¼–⅓ of $R_2$, e.g. about 2–3 feet, while depth "D" at the side wall 19 may be about 13–15 inches and the thickness "T" of the powdered to semi-molten batch layer may be about 3–5 inches or more (e.g. up to 10").

With further reference to FIG. 1 and FIG. 4 more particularly, melter 1 is provided with a side discharge port generally at 39 for distributing molten glass from pool 11 to conditioner 3. In preferred embodiments of this invention side discharge port 39 is constructed according to my aforesaid application Ser. No. 08/917,207, now U.S. Pat. No. 5,961,686. As disclosed therein and as illustrated here, discharge port 39 includes a corrosion resistant metallic tube 41 (e.g. of molybdenum or an alloy thereof and usually of the same metal which makes up drain tube 33) extending through the side wall structure of tank 1 in flow communication with the entrance end of conditioner 3. As shown in FIGS. 1 and 5, tube 41 is thicker at its top than bottom circumference, and is cooled by circulating water or other fluid through surrounding shell 43 in the direction of the arrows (FIG. 5).

The purpose of making the top of tube 41 thicker is because, for some reason not fully understood, and despite the fact that tube 41 is fully submerged in molten glass theoretically protecting it throughout its circumference from oxidation, the top of tube 41 wears out more rapidly than its bottom portion. Thus it has been found in practice to be advantageous for longer wear life to, for example, with a discharge tube of about 6 inches (O.D.), use a 4 inch (ID) orifice created by a ½ inch offset from center. While not fully understood, this uneven wear pattern may be explainable by the phenomenon known as "upward drilling" in a refractory material as it is corroded by corrosive materials in the glass.

Conditioner 3 is principally used to lower the glass exiting melter 1 to an appropriate temperature for distribution to the forehearth. For example, in a typical operation, glass "G" may exit side discharge tube 41 at a temperature of about 2560° F., and be lowered to about 2230° (e.g. a drop of greater than 200° F.) as it enters forehearth 5 beneath submerged block (dam) 45 which functions along with dam 47 to isolate molten glass in conditioner 3 from glass in forehearth 5 during shutdown. Dam 45 further serves to isolate the relatively volatile free atmosphere of forehearth 5 from the atmosphere of conditioner 3. In a similar manner, of course, dam 49 isolates molten glass in conditioner 3 from melter 1 and exhaust area "E" (described below) during a shutdown. Drain port 51 is provided in bottom wall 53 (which may be water-cooled) to drain glass from conditioner 3 prior to shutdown or when otherwise needed.

Provided in top wall 55 of conditioner 3 is a cooling baffle structure 57 (more than one can be optionally added, if desired) for circulating cooling water or air therethrough. Baffle 57 is a unique concept to this invention. Without baffle(s) 57, there would be formed a stream of higher temperature glass on the surface of flow, potentially causing lower glass to crystallize. Baffle(s) 57 divert hot glass downwardly, thereby preventing this problem from occurring and creating better homogeneity of temperature in the glass and a lack of stagnant glass in the bottom of conditioner 3.

In addition, top wall 55 is provided with removable burners 59a–e located in their respective orifices extending through wall 55. During start-up of the system, in conventional fashion, burners 59a–e are employed to heat the refractory walls so that molten glass flowing from melter 1 and exiting tube 41 will remain molten, and continue to flow through conditioner 3, rather than solidify when it contacts the refractory walls.

After start-up and filling conditioner 3 to the depth desired with molten glass (not shown for convenience), the molten glass must then be cooled to the required exit temperature as aforesaid. For this purpose, one or more of the removable burners 59a–e are removed (thus vacating their respective orifice 60a, b, c, d, or e) and replaced by water-cooled tubes such as a cooling tube 61 shown in FIG. 6, which is inserted into a vacated orifice made open by removal of a burner 59 therefrom. As shown in FIG. 6, cooling tube 61 is a simple rectangular or circular shell 63 (depending on the conforming shape of the vacated orifice it is inserted in). Shell 63 has located in its wall, water outlet port 65. Within shell 63 there is located an internal tube 67 for providing cooling water (or other fluid) to shell 63 in the direction of the arrows. Cooling tubes 61 are metallic and may be made of a corrosion resistant metal such as molybdenum, if desired. Tubes 61 can be provided with a simple mechanism for controlling their depth of emersion into the molten glass. This, in turn, can be used to ultimately control the outlet temperature of the glass at the entrance 6 of forehearth 5. In this respect, orifice 64 is used for a thermocouple (not shown) to sense the temperature of the glass that is entering forehearth 5.

To cool the glass, cooling air may be used instead of, or alternatively with, cooling tubes 61. For example, in a typical operation which cools the molten glass from about 2560° F. to 2230° F. in conditioner 3, orifice 59a may have cooling air blown through it, as may orifice 59e. This also forces an atmosphere changeover to continuously rid the atmosphere of volatiles. Then, cooling tubes 61 may be inserted into orifices 59b and c. This leaves orifice 59d open for use in a unique exhaust system as contemplated by this invention and as described below. It is understood, of course, that orifices 59a–e may have other combinations of air flow and/or cooling tubes employed, including all cooling tubes 61 or all cooling air flow if desired. It is, however, an important feature of a preferred embodiment of this invention that at least one of these vacated orifices, preferably either orifice 59d or 59e, and most preferably 59d, be employed to exhaust corrosive volatiles from the atmosphere above the molten glass in conditioner 3.

As illustrated in FIG. 1 in phantom dotted lines, an exhaust system 69 is provided at orifice 59d which may be turned on after burner 59d is removed, thus exhausting volatiles from conditioner 3 before they reach forehearth 5. As a further part of a preferred exhaust system, a further permanent exhaust port 71 is provided at the initial entrance end of area "E" in conditioner 3 where an initial portion of the volatiles may first be removed from the atmosphere above the molten glass immediately as it exits side discharge tube 41.

Turning now, more particularly, to the electrode melting apparatus illustrated in FIGS. 1–3, there is presented a unique apparatus and method for controlling the size and location of "hot spot" 9 which can otherwise be so detrimental to wear out, and which, if not controlled, can cause unnecessary multiple shutdowns of the system as described above.

In the melting configuration as illustrated there are provided six conventional electrode melters 13 which are conventionally water-cooled by entrance line 73 and exit line 75. Other configurations using lesser numbers of, or more, electrodes may be used. Electrode 13, including its current-carrying shaft 79, may be formed of molybdenum as is the actual electrode melter portion 81. Water-cooled shell 77 may be formed of stainless steel. As illustrated schematically in FIG. 2 and more realistically in FIG. 1, electrode portion 81 is immersed in the molten glass 11 to the depth required, while molybdenum shaft 79 is protectively cooled by cooling shell 77.

Electrode 13 is supported by horizontal shaft 83 which carries electric current and the cooling water to and from the electrode. In turn, shaft 83 is connected to an adjusting mechanism 85 which includes a central shaft 87 which retains, in vertical position, outer shaft 89. Rotating mechanism 91 allows shafts 89, and thus shaft 83 attached thereto, to be angularly adjusted in the horizontal plane by rotating the shaft on ball bearing 93 and securing the shaft at the desired angle by a conventional locking mechanism 95 when the desired angle is reached.

In addition to this horizontal adjustment, the vertical position of electrode 13 within molten pool 11 is accomplished by gear rachet mechanism 97 which, via screw threaded rod 99 attached to shaft (sleeve) 89, slidable in retaining tube 101, may be activated to vertically adjust the height of shaft 83 above melter 1 and thus that of electrode 13 with respect to pool 11. Protective bellows 103 extends between slidable shaft 89 and upper nonslidable shaft 105 to which rachet mechanism 97 is attached, to protect that portion of shaft 87 on which shaft 89 slides during vertical adjustment, from dust and other contamination.

As can be seen, the adjusting mechanism 85 provides an effective mechanism for adjusting both the horizontal and vertical positions of each electrode 13 with respect to the molten bath. Since it is the electrode array which ultimately defines and limits the finite volume of "hot spot" 9 (e.g. typically at 3150° F.–3250° F.), the unique apparatus illustrated here presents, by its precise adjustability, the ability to control the location, size and, indeed, in certain instances, the general shape of the "hot spot" 9. Thus, by proper adjustment, the "hot spot" may be controlled at a preselected location within melter 1 (i.e. within pool 11) sufficiently removed from the sensitive refractory and metallic parts, so that these elements wear out at substantially the same time, thus minimizing the number of shutdowns needed for repair.

In a typical operation of the above-described system, electrodes 13 are adjusted so as to be equally spaced (as illustrated in FIG. 1A) about vertical axis "C" of tank 1. Electrode melter portion 81 of each electrode 13 may be approximately 6 inches in diameter and about 6½ inches in height and may be operated at about 4000 amps. Given a side height "D" within the aforesaid range, and a radius $R_2$ of about 8 feet and a radius $R_1$ of about 3 feet, with an adjusted depth of about 9-12 inches between the bottom of electrodes 13 and the top surface of bottom wall liner 25 for each of the six electrodes employed in the array as shown, a "hot spot" 9 as illustrated in FIGS. 1, 1A is sufficiently controlled and confined to a finite volume within the electrode array such that the "hot spot", usually at about 3150° F.-3250° F. is substantially removed from the refractory walls and discharge ports, while such walls and ports are located nearest the coolest glass as cooled by the cooling water in cooling shell 29 and as affected by glass flow currents shown by the circulating arrows in FIG. 1. In this way, and by proper adjustment of the electrode array for any given configuration of melting tank, arrived at by routine experimentation well within the skill of the artisan once given this disclosure, a unique technique for substantially equalizing wear out of the melting tank parts may be accomplished, thus minimizing the number of shutdowns required for replacement of parts.

Once given the above disclosure, many other features, modifications and improvements will become apparent to the skilled artisan. Such features, modifications and improvements are, therefore, considered a part of this invention, the scope of which is to be determined by the following claims:

I claim:

1. In the combination of a walled melter, a walled conditioning system having at least one heating element extending through an orifice in a wall thereof and a forehearth, said melter being connected in molten glass flow communication with said conditioning system through a discharge port located in a wall of said melter at a first end of said conditioning system and said opposite end of said conditioning system being connected in molten glass flow communication with said forehearth, the improvement comprising at least one removable heating element extending through said orifice in a wall thereof and exhaust means proximal said orifice for exhausting corrosive volatiles from above said molten glass in said conditioning system through the orifice when said removable heating element is removed therefrom.

2. The combination of claim 1 wherein said conditioning system has an entrance end for receiving molten glass from said melter, and said discharge port is in flow communication with said entrance end of said conditioning system thereby forming a juncture between said melter and said conditioning system, the combination further comprising a second exhaust system at said juncture for exhausting corrosive volatiles during the glass melting and conditioning operation.

3. The combination of claim 2 wherein said melter further includes means for providing batch material on top of said molten glass when in said melter so as to float on said molten glass in a layer thereon.

4. In the method of melting, conditioning and distributing molten glass wherein said method includes the steps of providing in serial flow communication, a melter, a walled conditioner and a forehearth array, melting glass in said melter, delivering molten glass from said melter to said conditioner, providing at least one heating means located in an orifice in a wall of said conditioner, delivering said molten glass from said conditioner to said forehearth and distributing said molten glass from said forehearth, wherein the method further includes the step of removing a substantial portion of said corrosive volatiles from the atmosphere above the glass before they reach the forehearth, the improvement comprising, removing at least one of said heating means from its respective orifice, thereby to provide an open orifice in a wall of said conditioner, providing an exhaust means in exhaust functioning communication with respect to said open orifice, and exhausting corrosive volatiles from said conditioner through said open orifice.

5. The method of claim 4 wherein said method further includes the step of providing batch material on top of the molten glass in said melter.

* * * * *